United States Patent
Zhang et al.

(10) Patent No.: US 10,640,401 B2
(45) Date of Patent: May 5, 2020

(54) REACTIVE ELECTROCHEMICAL MEMBRANE FILTRATION

(71) Applicant: New Jersey Institute of Technology, Newark, NJ (US)

(72) Inventors: Wen Zhang, Livingston, NJ (US); Likun Hua, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 271 days.

(21) Appl. No.: 15/589,219

(22) Filed: May 8, 2017

(65) Prior Publication Data

US 2017/0334751 A1    Nov. 23, 2017

Related U.S. Application Data

(60) Provisional application No. 62/337,940, filed on May 18, 2016.

(51) Int. Cl.
  *C02F 1/461* (2006.01)
  *C02F 3/00* (2006.01)
  (Continued)

(52) U.S. Cl.
  CPC .......... *C02F 1/46109* (2013.01); *B01D 35/06* (2013.01); *C02F 1/4672* (2013.01);
  (Continued)

(58) Field of Classification Search
  CPC .. B01D 35/06; C02F 1/46104; C02F 1/46109; C02F 2001/4633; B09C 1/085
  See application file for complete search history.

(56) References Cited

U.S. PATENT DOCUMENTS 8,318,008 B1 * 11/2012 Anderson .......... B01D 21/2427
                                              210/137
2004/0262243 A1 * 12/2004 Bosko ................... B01D 29/66
                                              210/791
(Continued)

FOREIGN PATENT DOCUMENTS

JP        59076509 A  *  5/1984

OTHER PUBLICATIONS

Amr M. Zaky and Brian P. Chaplin. Porous Substoichiometric TiO2 Anodes as Reactive Electrochemical Membranes for Water Treatment. Environmental Science & Technology. Jun. 8, 2013 vol. 47, Iss. 12. pp. 6554-6563 (Year: 2013).*

(Continued)

Primary Examiner — Steven A. Friday
(74) Attorney, Agent, or Firm — Lerner, David, Littenberg, Krumholz & Mentlik, LLP

(57) ABSTRACT

A system and method for algal harvesting and destabilization are provided. The system includes a multifunctional reactive electrochemical membrane (REM). The application of an electrical current generates reactive species at the REM surface and oxidizes algae and soluble organic compounds. This novel type of membrane filtration avoids the use of harmful chemical additives. In addition, it provides the benefits of avoiding polymer aging, membrane fouling, and high costs caused by high transmembrane pressures and frequent membrane cleaning. Traditional membrane separation that significantly suffers from membrane fouling due to either the formation of a cake layer of algal cells, or more commonly due to organic matter adsorption onto the membrane surface is significantly avoided.

15 Claims, 2 Drawing Sheets

(51) Int. Cl.
| | |
|---|---|
| *B01D 35/06* | (2006.01) |
| *C02F 3/12* | (2006.01) |
| *C02F 1/467* | (2006.01) |
| *C02F 1/00* | (2006.01) |
| *C02F 3/32* | (2006.01) |

(52) U.S. Cl.
CPC ............ *C02F 3/005* (2013.01); *C02F 3/1273* (2013.01); *C02F 3/322* (2013.01); *C02F 2001/007* (2013.01); *C02F 2001/46157* (2013.01); *C02F 2001/46171* (2013.01); *C02F 2201/46115* (2013.01); *C02F 2209/40* (2013.01); *C02F 2209/42* (2013.01); *C02F 2303/16* (2013.01); *Y02W 10/15* (2015.05)

(56) References Cited

U.S. PATENT DOCUMENTS

| | | | | |
|---|---|---|---|---|
| 2010/0051542 | A1* | 3/2010 | Elektorowicz | C02F 1/463 210/631 |
| 2012/0090988 | A1* | 4/2012 | Li | B01D 67/0048 204/230.2 |
| 2012/0211367 | A1* | 8/2012 | Vecitis | B82Y 30/00 204/554 |
| 2014/0144836 | A1* | 5/2014 | Nyhuis | C02F 9/00 210/605 |
| 2015/0246831 | A1* | 9/2015 | Jha | B01F 5/0608 204/519 |

OTHER PUBLICATIONS

Babel et al., "A study on membrane fouling due to algal deposition", Water Science & Technology, vol. 41, Issue 10-11, 3 pages, May 2000.

Bejan et al., "Mechanistic investigation of the conductive ceramic Ebonex as an anode material", Electrochimica Acta, 54, pp. 5548-5556, May 2009.

Brennan et al., "Biofuels from microalgae—A review of technologies for production, processing, and extractions of biofuels and co-products", Renewable and Sustaniable Energy Reviews, 14, pp. 557-577, Oct. 2009.

Chen et al., "Electolytic oxidation of tricholoroethylene using a ceramic anode", Journal of Applied electrochemistry, 29, pp. 961-970, Aug. 1999.

Henderson et al., "Characterisation of algogenic organic matter extracted from cyanobacteria, green algae and diatoms", Water Research, 42, pp. 3435-3445, Jul. 2008.

Huang et al., "Characteristics of algogenic organic matter generated under different nutrient conditions and subsequent implact on microfiltration membrane fouling", Desalination, 293, pp. 104-111, Mar. 2012.

Lim et al., "Rapid Magnetophoretic Separation of Microalgae", Wiley Online Library, vol. 8, Issue 11, pp. 1683-1692, Jun. 2012.

Scialdone et al., "Electrochemical incineration of 1,2-dichloroethane: Effect of the electrode material", Electrochimica Acta, 53, pp. 7220-7225, May 2008.

Uduman et al., "Dewatering of microalgal cultures: A major bottleneck to algae-based fuels", Journal of Renewable and Sustainable Energy, 2, pp. 012701-1-012701-15, Jan. 2010.

Vandamme et al., "Flocculation as a low-cost method for harvesting microalgae for bulk biomass production", Trends in Biotechnology, vol. 31, Issue 4, pp. 233-239, Apr. 2013, Cell Press.

Zhang et al., "Characterization of dissolved organic matters responsible for ultrafiltration membrane fouling in algal harvesting" Algal Research, vol. 2, Issue 3, pp. 223-229, Jul. 2013.

Zhang et al., "The role of hydrodynamic conditions and pH on algal-rich water fouling of ultrafiltration", Water Research, vol. 46, Issue 15, pp. 4783-4789, Oct. 2012.

Hua et al., "Effects of anodic oxidation of a substoichiometric titanium dioxide reactive electrochemical membrane on algal cell destabilization and lipid extraction", Bioresourse Technology, vol. 203, p. 112-117, Mar. 2016.

\* cited by examiner

REACTIVE ELECTROCHEMICAL MEMBRANE FILTRATION

CROSS-REFERENCE TO RELATED APPLICATION

The present application claims the benefit of the filing date of U.S. Provisional Patent Application No. 62/337,940, filed May 18, 2016, the disclosure of which is hereby incorporated herein by reference.

FIELD

The present disclosure relates to water treatment and biomass separation. In particular, the present disclosure relates to an electrochemical membrane filtration for water purification and biomass separation.

BACKGROUND

Rapid and high efficient biomass harvesting is not only critical for biomass engineering and biofuel production but also important for water or wastewater treatment industries to produce clean water. High efficient algal biomass removal from water will lower the operational cost and increase the economic viability of produced products (biomass, biofuel or bioenergy, and clean water). Some of the current dewatering technologies, such as flocculation and centrifugation, require a large amount of energy or chemical addition.

Membrane filtration is a common dewatering technology. During membrane filtration, a membrane serves as a barrier, allowing passage of water while retaining algae or other substances to be collected. Membrane filtration does not utilize any harmful chemical additives. However, traditional membrane filtration faces major challenges such as polymer aging, membrane fouling, and high costs (e.g., caused by high transmembrane pressures and frequent membrane cleaning). In particular, traditional membrane separation significantly suffers from membrane fouling due to either the formation of a cake layer of algal cells, or more commonly due to organic matter adsorption onto the membrane surface. Thus, there is a need to develop innovative membrane filtration processes that can efficiently separate algae with strong antifouling characteristics.

SUMMARY

The present invention solves the problems of current state of the art and provides many more benefits. In accordance with embodiments of the present disclosure, an innovative and multifunctional reactive electrochemical membrane (REM) is provided. The REM acts as a model filtration membrane that exhibits excellent antifouling characteristics and strong surface reactivity. The application of a direct current (DC), alternating current (AC) or a combination of both, generate reactive species at the REM surface oxidizes algae and soluble organic compounds. Algal cell (as a model microorganism) integrity was changed with exposure to the REM, including deformation, photosynthetic activity decline and released intracellular organics, which indicate the effective surface oxidation against biomass. There are additional benefits of REM such as reduced membrane fouling, reduction of organic (toxic) compounds in permeate and energy consumption for backwash and flux recovery, and water purification.

Any combination and/or permutation of the embodiments are envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those skilled in the art in making and using the disclosed reactive electrochemical membrane and associated systems and methods, reference is made to the accompanying figures, wherein.

DETAILED DESCRIPTION

A multifunctional reactive electrochemical membrane (REM) filtration systems and methods are disclosed. Depending on the embodiment, the system includes subsystems and components to measure and control process variables, such as permeate flux and pressure, as required for effective performance. The apparatus could employ sensors or other condition detection and control subsystems or components that might be required to process at a particular rate or at a particular scale.

Figure 1:
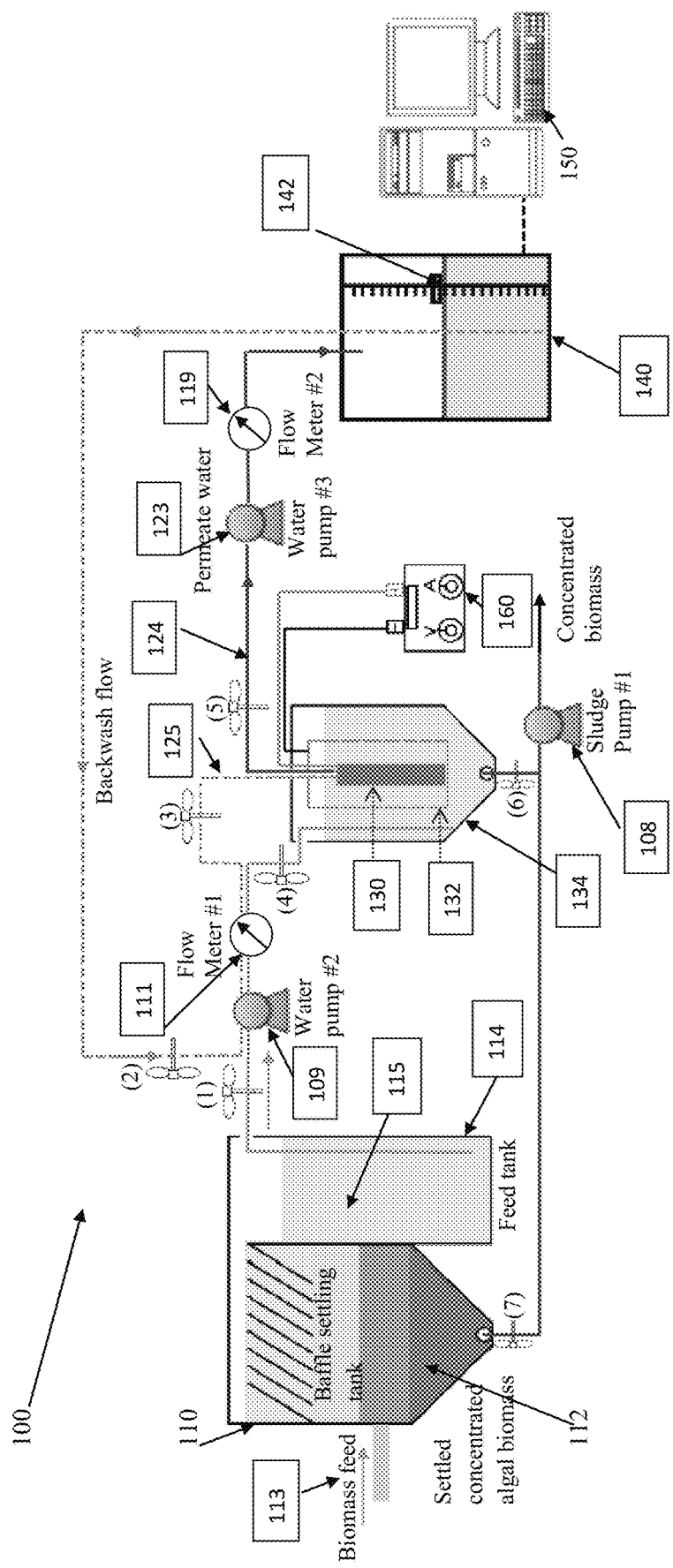
FIG. 1 is a schematic diagram of a multifunctional reactive electrochemical membrane (REM) filtration system with separated feed tank and REM filtration unit in accordance with the present disclosure.

FIG. 1 is a schematic diagram of multifunctional REM filtration system 100 with a separated feed tank 114 and a REM filtration unit or tank 134. The filtration system 100 includes a REM 130 and a mesh 132 that surrounds the REM. Depending on the implementation the mesh 132 may be stainless steel or other conductive material. The mesh 132 serves as a counter or auxiliary electrode. It will be understood that other counter or auxiliary electrodes could be used. Depending on the embodiment, the mesh may be cylinder-shaped and made of stainless steel. The mesh could have other shapes and could be made of any other suitable material. Depending on the implementation the mesh may partially or completely surround the REM membrane.

An alternate current (AC) or direct current (DC) power source, such as an AC or DC generator 160, is wired to the REM and the stainless steel mess. The power source may also be a combination of both AC and DC power. Depending on the embodiment, the REM may be a 10-cm long Ebonex® one-channel tubular electrode made of sub-stoichiometric titanium oxide ($Ti_4O_7$) with the outer and inner diameters of 10 mm and 6 mm (Vector Corrosion Technologies, Inc.). While the use of $Ti_4O_7$ is exemplary, the REM could be made of any other titanium suboxide or any other suitable material. In addition, the sizes of the electrode could vary depending on the application.

In FIG. 1, two water pipes 124, 125 are connected to the top of the REM 130. One of the water pipes 124 is used for permeate withdraw and the other water pipe 125 is used for backwash water flushing into the REM as indicated by the arrows on the pipe lines. While two water pipes are shown, the number of water pipes could vary. In the shown embodiment, REM 130 is a tube. The bottom of the REM 130 is sealed to allow water to pass through a membrane surface only of the REM 130. A flat sheet ceramic membrane could also be used in practical applications instead of the shown tube configuration.

As shown in FIG. 1, biomass feed 113 (e.g., algal suspension) first enters a baffle settling tank 110 to pre-settle and concentrate biomass 112 with the overflow of feed 113 flowing in the feed tank 114. The concentrated biomass 112 accumulated at the bottom of the baffle settling tank 110 is collected as algae sludge with Sludge Pump 108 (#1). The biomass suspension 115 in the Feed Tank 114 will be pumped into the REM filtration tank 134 by Water Pump 109 (#2), which is also used to pump backwash water to the REM 130 to remove fouling and recover flux. The Flow Meter 111 (#1) is used to monitor the flow rate. Permeate water will be sucked up and pumped by Water Pump 123 (#3) into a Receiving Tank 140 with a water level monitored sensor 142. The concentrated biomass 112 will settle and accumulate at the bottom of the REM tank 134. The accumulated biomass at the bottom will be decanted via gravity or Sludge Pump 108 (#1) for further processing.

To mitigate surface fouling and extend the effective filtration period, DC or AC power supply 160 could be used to generate surface radicals. For example, in one embodiment, AC could be applied intermittently (e.g., 10 minutes every 60 minutes) at 10 V with a radio frequency of 100 to 500 MHz to polarize REM or stainless steel surfaces and induce oxidant or radical production and electrostatic repulsion against potential foulants such as negatively charged biomass or biomolecules such as extracellular organic matters (EOMs). For example, under DC polarization from 50 $A \cdot m^{-2}$ to 250 $A \cdot m^{-2}$ or approximately 10 to 22 V of cell voltage, 0.0045 mM to 0.022 mM chlorine can be generated on the cathode surface within 2 hours in the presence of $Cl^-$. Meanwhile, 8 µM to 55 µM $H_2O_2$ can also be generated on the anode surface under the same condition. In one embodiment, AC or DC is applied continuously. In another embodiment, AC and DC are both applied. The application (duration and frequency) of DC/AC charging is at user's discretion and a good criterion would be mitigating fouling as indicated by the extended period of effective filtration time. However, it is anticipated that the energy consumption might be increased consequently with frequent AC/DC charging.

Surface fouling or pore clogging on the ceramic membrane will be indicated by the changes of permeate flux measured by Flow Meter 109 (#2) or the water level sensor. If the permeate flux declines and drops down to near zero, backwash is performed together with DC or AC polarization. Different backwash sequences could be used to maximize foulant removal and permeate recovery. For example, clean water could be withdrawn from the Receiving Tank 140 by Water Pump 109 (#2) into the REM 130 to physically cleanse the membrane pores of the REM from inside out. Furthermore, the DC or AC power supply could be turned on (e.g., at 10 V or current density of 20 $mA/cm^2$ or higher) for 5 minutes or longer to promote surface radicals generation and oxidation of surface foulants.

Depending on the implementation, the controls of pumps and valves of the system 100 are interconnected and function such that the following may occur;

(1) During a filtration stage, as shown in FIG. 1, valves (1), (4) and (5) remain open while valves (2) and (3) shut off. Water pumps 109 (#2) and pump 123 (#3) are on.

(2) During backwash, valves (2) and (3) open simultaneously while valves (1), (4) and (5) shut off. Water pump 109 (#2) is on while Water pump 123 (#3) is off.

(3) Water pump 123 (#3) is controlled with the signal from Flow Meter 119 (#2) or water level sensor 142 in the receiving tank 140.

(4) The accumulated biomass concentration at the bottom of the baffle settling tank 110 and tank 134 may be monitored by online turbidity or UV-Vis absorption sensors to control valves (6) and (7). When the biomass concentration is greater than 2 g/L (e.g., UV-vis reading reaches 1 or higher), the two valves (6) and (7) will be open with the Sludge Pump 108 (#1) turned on to dispose concentrated biomass from the bottom of the settling tank 110 and the REM tank 134.

The system 100 could include a controller 150 in communication with a sensor, such as a water level sensor 142 or an absorption sensor (not shown). The controller 150 may receive at least one process parameter, process the at least one process parameter, and adjust operation of the system based upon processing of the at least one process parameter.

Figure 2:
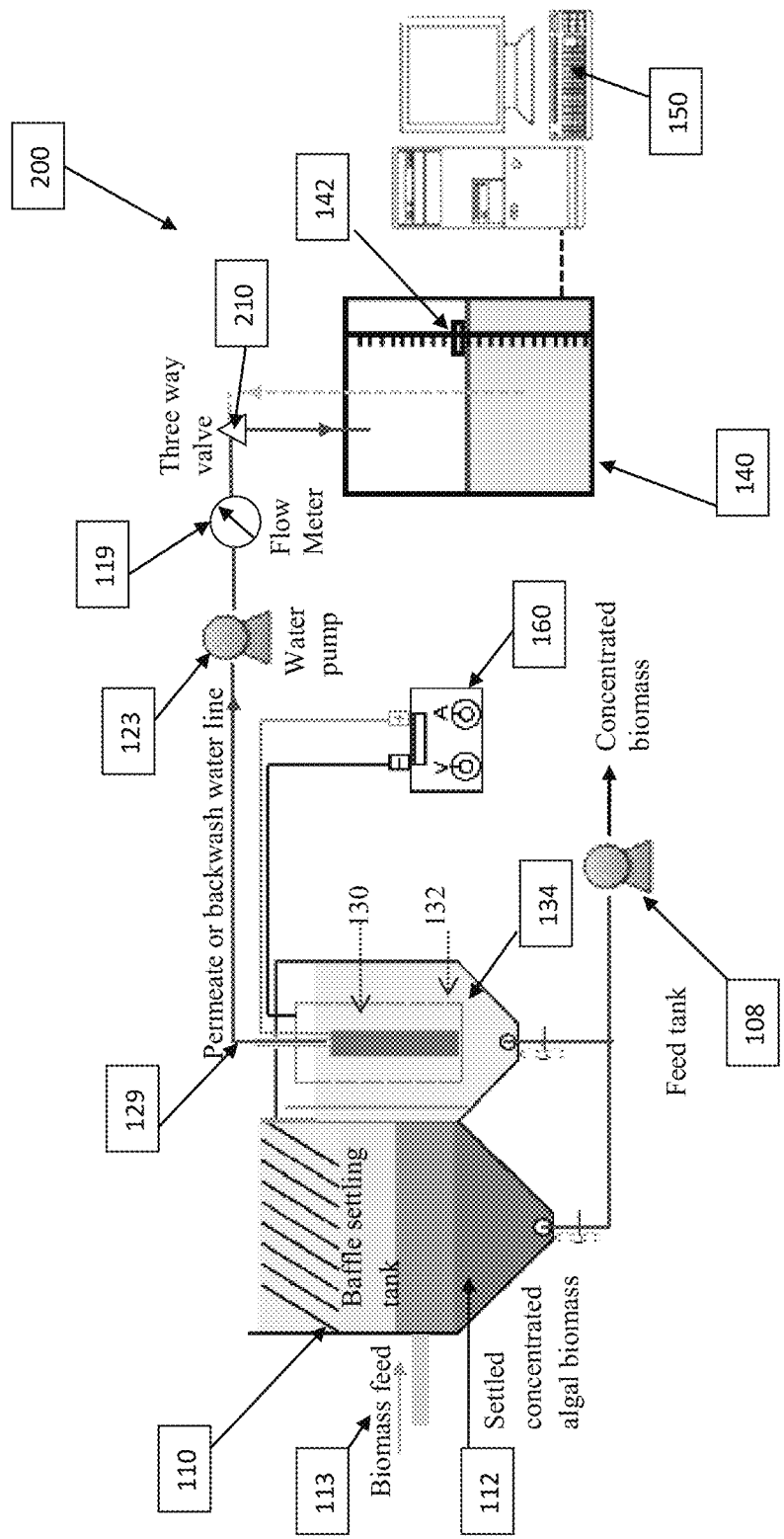
FIG. 2 is a schematic diagram of a compact and integrated REM filtration system with less footprint and material utilization in accordance with the present disclosure.

FIG. 2 is a schematic diagram of a REM filtration system 200 in accordance with another embodiment. Similar numbers in the Figures represent similar components and functions of the same. Integrated filtration process with less footprint and material utilization may be built as shown in FIG. 2 such that a water pump 123 will be used as both suction of permeate during filtration mode and backwash water during backwash mode. The pipes for permeate and backwash water flows could essentially share in one pipeline 129 in one embodiment. The switch of the filtration and the backwash could be realized by changing rotation direction of the water pump 123 and a three-way valve 210 that switches between permeate discharge and backwash water withdraw.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. An electrochemical membrane filtration system for water purification and biomass separation, comprising:
    a multifunctional reactive electrochemical membrane having a porous substance and a filtration reactive electrochemical membrane surface, the membrane acting as an electrode and disposed in a filtration tank;
    an electrically conductive mesh having a mesh surface and surrounding the membrane and performing as a counter electrode to the membrane; and
    a power source connected to the membrane and the mesh wherein an electrical current generates reactive species at the reactive electrochemical membrane surface and oxidizes algae and soluble organic compounds; and
    wherein the power source is an AC power source, and surface radicals are generated by applying an AC current at an intermittent rate and at a radio frequency of 100 to 500 MHz to polarize the reactive electrochemical membrane surface or the mesh surface or both the membrane and the mesh surfaces for inducing oxidant or radical production and electrostatic repulsion against potential foulants.

2. The electrochemical membrane filtration system in claim 1, wherein the membrane is made of a ceramic material.

3. The electrochemical membrane filtration system in claim 2, wherein the ceramic is $Ti_4O_7$.

4. The electrochemical membrane filtration system in claim 1, wherein the membrane is made of a conductive material in the form of a tube or a flat membrane.

5. The electrochemical membrane filtration system in claim 1, wherein the mesh is a stainless steel mesh.

6. The electrochemical membrane filtration system in claim 1, wherein the mesh completely surrounds the membrane.

7. The electrochemical membrane filtration system in claim 1, wherein the power source is used to polarize the membrane surface or the mesh surface to generate radicals for organic compound degradation and removal and repulsion of surface foulants.

8. The electrochemical membrane filtration system in claim 7, wherein surface radicals are generated by applying an electric current density from 50 $A \cdot m^{-2}$ to 250 $A \cdot m^{-2}$ or approximately 10 to 22 V of voltage.

9. The electrochemical membrane filtration system in claim 1, further including a baffle settling tank in communication with the filtration tank, wherein the baffle settling tank is used for a pre-settling process to concentrate biomass.

10. An electrochemical membrane filtration system for water purification and biomass separation, comprising:
- a multifunctional reactive electrochemical membrane having a porous $Ti_4O_7$ substance and a filtration reactive electrochemical membrane surface, the membrane acting as an electrode and disposed in a filtration tank;
- a stainless steel mesh having a mesh surface and surrounding the membrane inside the filtration tank, wherein the mesh is a counter electrode to the membrane;
- a baffle settling tank for receiving a biomass feed and concentrating algal biomass, the baffle settling tank in communication with the filtration tank;
- a receiving tank in communication with the membrane and containing filtered water from the filtration tank;
- a power source connected to the membrane and the mesh wherein an electrical current generates reactive species at the reactive electrochemical membrane surface and oxidizes algae and soluble organic compounds; and
- wherein the power source is an AC power source, and surface radicals are generated by applying an AC current at an intermittent rate and at a radio frequency of 100 to 500 MHz to polarize the reactive electrochemical membrane surface or the mesh surface or both the membrane and the mesh surfaces for inducing oxidant or radical production and electrostatic repulsion against potential foulants.

11. The electrochemical membrane filtration system in claim 10, further including a three-way valve disposed between the membrane and reeving tank, wherein the theeway valve switches between a permeate discharge position and a backwash water position to withdraw water from the receiving tank.

12. The electrochemical membrane filtration system in claim 10, wherein the receiving tank further includes a water level sensor or an absorption sensor.

13. The electrochemical membrane filtration system in claim 12, further including a controller in communication with the water level sensor or absorption sensor, wherein the controller receives at least one process parameter, and adjusts operation of the system based upon processing of the at least one process parameter.

14. The electrochemical membrane filtration system in claim 13, further including a flow meter disposed between the membrane and the receiving tank.

15. The electrochemical membrane filtration system in claim 14, wherein surface fouling or pore clogging on the membrane is indicated by the changes of a permeate flux measured by the flow meter or the water level sensor, and backwash is performed together with AC polarization when the permeate flux declines.

* * * * *